(12) United States Patent
Nishimaki et al.

(10) Patent No.: US 10,591,735 B2
(45) Date of Patent: Mar. 17, 2020

(54) HEAD-MOUNTED DISPLAY DEVICE AND IMAGE DISPLAY SYSTEM

(71) Applicant: SONY INTERACTIVE ENTERTAINMENT INC., Tokyo (JP)

(72) Inventors: Yoichi Nishimaki, Kanagawa (JP); Yoshinori Ohashi, Tokyo (JP); Takao Maruyama, Kanagawa (JP); Koichi Shiono, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 2 days.

(21) Appl. No.: 15/540,059

(22) PCT Filed: Sep. 24, 2015

(86) PCT No.: PCT/JP2015/076933
§ 371 (c)(1),
(2) Date: Jun. 27, 2017

(87) PCT Pub. No.: WO2016/113951
PCT Pub. Date: Jul. 21, 2016

(65) Prior Publication Data
US 2018/0217380 A1    Aug. 2, 2018

(30) Foreign Application Priority Data

Jan. 15, 2015    (JP) .................................. 2015-005991

(51) Int. Cl.
*G02B 27/01*    (2006.01)
(52) U.S. Cl.
CPC ..... *G02B 27/0176* (2013.01); *G02B 27/0172* (2013.01); *G02B 27/0179* (2013.01);
(Continued)

(58) Field of Classification Search
CPC .. G02B 27/01; G02B 27/017; G02B 27/0101; G02B 27/0103; G02B 27/0176;
(Continued)

(56) References Cited

U.S. PATENT DOCUMENTS

2004/0109135 A1* 6/2004 Watanabe ............ A61B 3/1225
                                                                351/205
2008/0106613 A1    5/2008 Van Schalkwyk

FOREIGN PATENT DOCUMENTS

JP    2001100903 A    4/2001
JP    2003-186462 A    7/2003
(Continued)

OTHER PUBLICATIONS

English translation of JP 2012194501, machine translated on Aug. 16, 2018.*
(Continued)

*Primary Examiner* — Jie Lei
(74) *Attorney, Agent, or Firm* — Katten Muchin Rosenman LLP

(57) ABSTRACT

A head-mounted display device (30) is provided which includes: optical elements (33L, R) disposed in front of the eyes of a user and configured to introduce light associated with images to be presented to the user into the eyes of the user; and a drive mechanism configured to move the optical elements in directions intersecting with visual line directions of the user. An image display system is further provided which includes the head-mounted display device (30) and an image supply device (10) including: an image supply part configured to supply the images to the head-mounted display device; and a display position control part configured to output control instructions to operate the drive mechanism in a manner changing the positions at which the images are displayed within fields of view of the user.

5 Claims, 9 Drawing Sheets

(52) U.S. Cl.
CPC ............... *G02B 2027/0138* (2013.01); *G02B 2027/0159* (2013.01); *G02B 2027/0187* (2013.01)

(58) Field of Classification Search
CPC ............ G02B 27/0172; G02B 27/0149; G02B 27/0179; G02B 2027/0187; G02B 2027/0138; G02B 2027/0159; G09G 3/003
USPC ............ 359/13, 630–633; 345/7–9; 348/115, 348/116; 349/11
See application file for complete search history.

(56) References Cited

FOREIGN PATENT DOCUMENTS

| | | |
|---|---|---|
| JP | 2003230539 A | 8/2003 |
| JP | 2006-308674 A | 11/2006 |
| JP | 2010152443 A | 7/2010 |
| JP | 2012-194501 A | 10/2012 |
| JP | 2014-10326 A | 1/2014 |

OTHER PUBLICATIONS

English translation of JP 2006308674, machine translated on Aug. 16, 2018.*
English translation of JP 2003186462, machine translated Aug. 16, 2018.*
International Preliminary Report on Patentability dated Jul. 27, 2017, from the corresponding PCT/JP2015/076933.
Japanese Office Action dated Oct. 3, 2017, from the corresponding JP 2016-569222.
Notification of Reasons for Refusal dated Feb. 13, 2018, from the corresponding Japanese Patent Application No. JP2016-569222.
International Search Report and Written Opinion dated Dec. 1, 2015, from the corresponding PCT/JP2015/076933.

* cited by examiner

HEAD-MOUNTED DISPLAY DEVICE AND IMAGE DISPLAY SYSTEM

TECHNICAL FIELD

The present invention relates to a head-mounted display device worn on the head of a user, an image display system that includes the head-mounted display device, an image supply device that supplies images to the head-mounted display device, a control program for controlling the image supply device, and an information storage medium.

BACKGROUND ART

Display devices worn on the head of the user (head-mounted display device), called head-mounted displays or smart glasses, have been known. This type of display device forms images in front of the user's eyes for viewing by the user (e.g., see PTL 1).

CITATION LIST

Patent Literature

[PTL 1]
JP 2014-10326 A

SUMMARY

Technical Problem

The above-mentioned head-mounted display device has a fixed display position for images. The image display position may or may not be optimal depending on the user's physique or on how the head-mounted display device is worn.

The present invention has been made in view of the above circumstances. It is therefore an object of the invention to provide a head-mounted display device that allows the display position for images to be adjusted, an image display system that includes the head-mounted display device, an image supply device that supplies images to the head-mounted display device, a control program for controlling the image supply device, and an information storage medium.

Solution to Problem

A head-mounted display device according to the present invention includes: an optical element disposed in front of an eye of a user and configured to introduce light associated with an image to be presented to the user into the eye of the user; and a drive mechanism configured to move the optical element in a direction intersecting with a visual line direction of the user.

An image display system according to the present invention includes a head-mounted display device and an image supply device. The head-mounted display device includes: an optical element disposed in front of an eye of a user and configured to introduce light associated with an image to be presented to the user into the eye of the user; and a drive mechanism configured to move the optical element in a direction intersecting with a visual line direction of the user. The image supply device includes: an image supply part configured to supply the image to the head-mounted display device; and a display position control part configured to output a control instruction to operate the drive mechanism in a manner changing the position at which the image is displayed within a field of view of the user.

An image supply device according to the present invention is connected with a head-mounted display device having a drive mechanism configured to move an optical element for introducing light associated with an image to be presented to a user into an eye of the user, the optical element being moved in a direction intersecting with a visual line direction of the user. The image supply device includes: an image supply part configured to supply the image to the head-mounted display device; and a display position control part configured to output a control instruction to operate the drive mechanism in a manner changing the position at which the image is displayed within a field of view of the user.

A program according to the present invention is for a computer connected with a head-mounted display device having a drive mechanism configured to move an optical element for introducing light associated with an image to be presented to a user into an eye of the user, the optical element being moved in a direction intersecting with a visual line direction of the user. The program causes the computer to function as an image supply part configured to supply the image to the head-mounted display device; and as a display position control part configured to output a control instruction to operate the drive mechanism in a manner changing the position at which the image is displayed within a field of view of the user. This program may be stored on a computer-readable information storage medium when offered.

DESCRIPTION OF EMBODIMENTS

Some preferred embodiments of the present invention are described below in detail with reference to the accompanying drawings.

Figure 1:
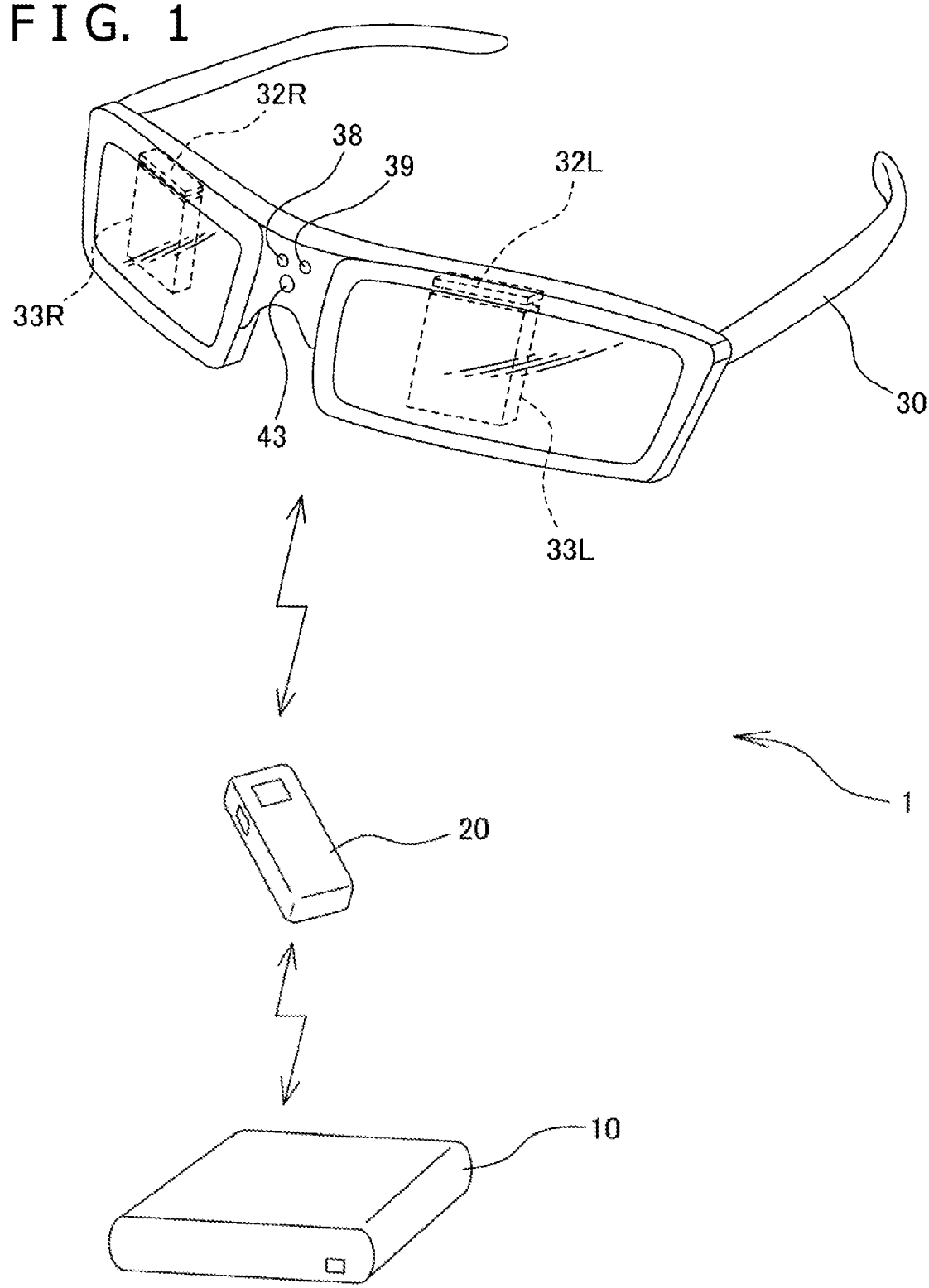
FIG. 1 is an overall schematic view of an image display system embodying the present invention.
Figure 2:
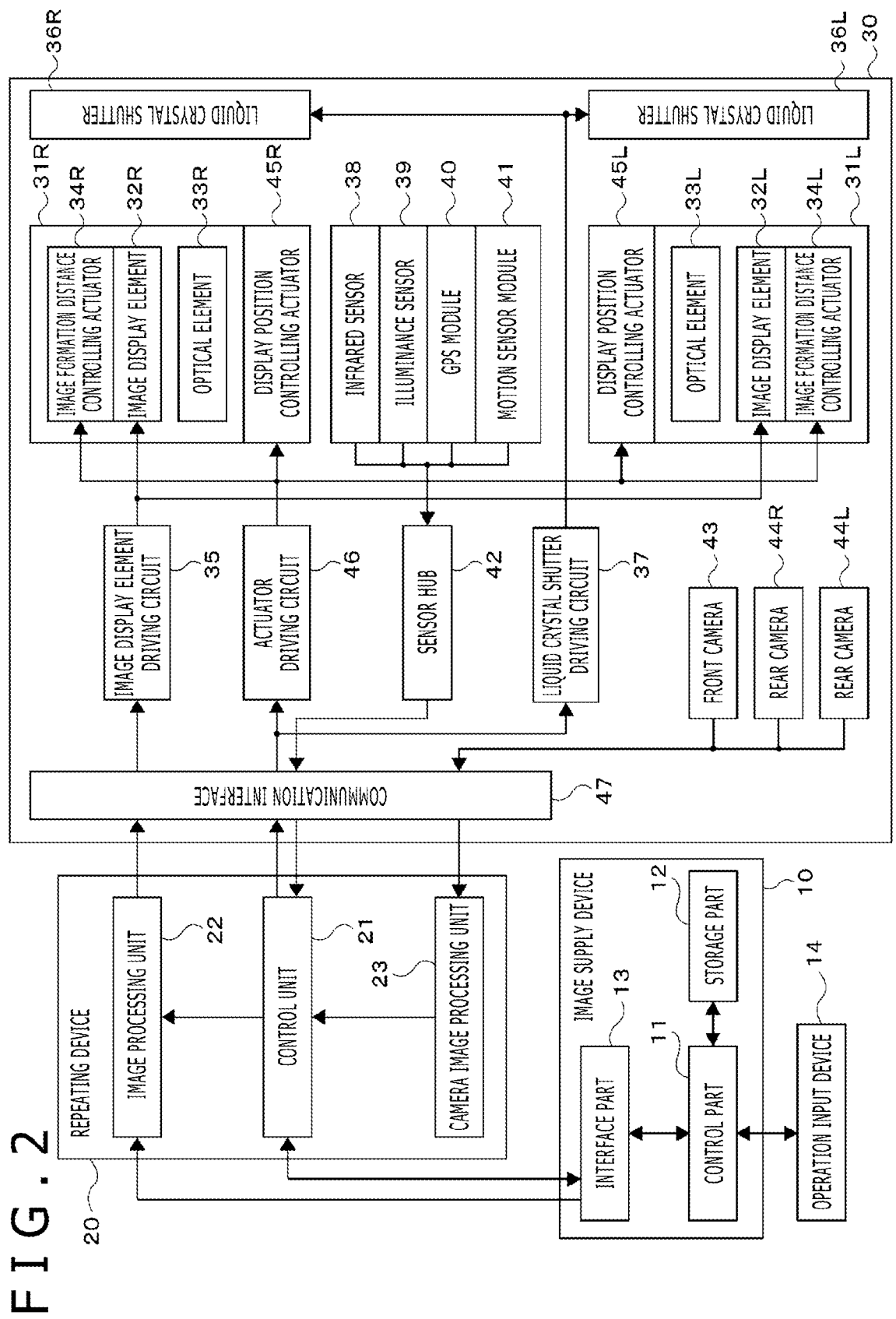
FIG. 2 is a block diagram showing a configuration of the image display system embodying the present invention.

FIG. 1 is an overall schematic view of an image display system 1 embodying the present invention. FIG. 2 is a block diagram showing a configuration of the image display system 1. As shown in these drawings, the image display system 1 is configured to include an image supply device 10, a repeating device 20, and a head-mounted display device 30.

The image supply device 10 is an information processing device that supplies images to be displayed by the head-mounted display device 30. As such, the image supply device 10 may be a home-use game machine, a portable game machine, a personal computer, a smartphone, or a tablet, for example. As shown in FIG. 2, the image supply device 10 is configured to include a control part 11, a storage part 12, and an interface part 13. The image supply device 10 is further connected with an operation input device 14.

The control part 11 is typically a central processing unit (CPU) that performs diverse kinds of information processing by executing programs stored in the storage part 12. Specific examples of the processing performed by the control part 11 of this embodiment will be described later. The storage part 12 includes a memory device such as a random-access memory (RAM). The storage part 12 stores the programs to be executed by the control part 11 as well as the data to be processed by the programs being executed. The operation input device 14 is typically a keyboard, a mouse, a touch panel, or a home-use game machine controller that accepts input operations from a user.

The interface part 13 provides an interface for data communication with the repeating device 20. The image supply device 10 is connected with the repeating device 20 in wired or wireless fashion via the interface part 13. The interface part 13 may include a video communication interface such as high-definition multimedia interface (HDMI; registered trademark) for transmitting images from the image supply device 10 to the repeating device 20. The interface part 13 may further include a data communication interface such as a universal serial bus (USB) arrangement for receiving various kinds of information from the head-mounted display device 30.

The repeating device 20 receives image data supplied from the image supply device 10 and outputs image signals reflecting the received data to the head-mounted display device 30. The repeating device 20 is connected with the head-mounted display device 30 in wired or wireless fashion.

As shown in FIG. 2, the repeating device 20 is configured to include a control unit 21, an image processing unit 22, and a camera image processing unit 23.

The control unit 21 is an integrated circuit which, typically in response to instructions from the image supply device 10, outputs various control signals to operate the internal components of the head-mounted display device 30. The control unit 21 also receives information measured by various internal sensors of the head-mounted display device 30. The control unit 21 provides the image supply device 10 with the content of the information thus received from the head-mounted display device 30.

The image processing unit 22 is a video processor that converts the image data supplied from the image supply device 10 into image signals that can be displayed by the head-mounted display device 30 and outputs the resulting image signals. In particular, the image processing unit 22 generates an image signal for a right-eye image and an image signal for a left-eye image based on the image data supplied from the image supply device 10. The image processing unit 22 outputs the generated image signals to the head-mounted display device 30. If the image to be displayed by the head-mounted display device 30 is a two-dimensional (2D) image, the image processing unit 22 outputs the same image signal for the right-eye and the left-eye images. On the other hand, if the image to be displayed by the head-mounted display device 30 is a three-dimensional (3D, or stereoscopic vision) image, the image processing unit 22 is required to output different image signals for the right-eye and the left-eye images so that the user can recognize the stereoscopic image by parallax. The two images for stereoscopic vision may be generated individually by the image supply device 10 and supplied to the image processing unit 22. Alternatively, the two images may be generated by the image processing unit 22 on the basis of information supplied from the image supply device 10. In the latter case, the image supply device 10, even if not supporting stereoscopic vision, can still enable the user to view the stereoscopic image.

The camera image processing unit 23 receives camera images captured by multiple cameras (to be discussed later) of the head-mounted display device 30 and, as needed, performs image processing on the received camera images. The result of the processing by the camera image processing unit 23 is output to the control unit 21.

The head-mounted display device 30 is an image display device worn on the head of the user. The head-mounted display device 30 displays images corresponding to the image signal input from the repeating device 20 so that the user can view the images. In this embodiment, the head-mounted display device 30 supports the viewing of images by both eyes, displaying images independently in front of the right and the left eyes of the users.

The head-mounted display device 30 is configured to include two image display units 31L and 31R, an image display element driving circuit 35, two liquid crystal shutters 36L and 36R, a liquid crystal shutter driving circuit 37, an infrared sensor 38, an illuminance sensor 39, a global positioning system (GPS) module 40, a motion sensor module 41, a sensor hub 42, a front camera 43, two rear cameras 44R and 44L, two display position controlling actuators 45L and 45R, an actuator driving circuit 46, and a communication interface 47.

The image display units 31L and 31R display a left-eye image and a right-eye image, respectively. With the head-mounted display device 30 worn on the head, the user views the left-eye image with the left eye and the right-eye image with the right eye. The image display unit 31L includes an image display element 32L, an optical element 33L, and an image formation distance controlling actuator 34L. The image display unit 31R includes an image display element 32R, an optical element 33R, and an image formation distance controlling actuator 34R.

The image display elements 32L and 32R are an organic electroluminescent (EL) display panel each, for example. In keeping with drive signals supplied from the image display element driving circuit 35, the image display elements 32L and 32R display images independent of each other. The image display element driving circuit 35 is an integrated circuit that the outputs drive signals for driving the image display elements 32L and 32R on the basis of the image signal input from the image processing unit 22 of the repeating device 20. Whereas this embodiment has one image display element driving circuit 35 driving the two image display elements 32L and 32R, the head-mounted display device 30 may alternatively include two image display element driving circuits 35 corresponding to the two image display elements 32L and 32R. Such a setup may utilize existing types of image display element driving circuits 35.

The optical elements 33L and 33R are typically a hologram device, a prism, or a half-mirror each. Disposed in front of the eyes of the user, the optical elements 33L and 33R refract the light of an image to be displayed by the image display elements 32L and 32R in a manner introducing the refracted light into the user's eyes. More specifically, the optical element 33L is disposed under the image display element 32L. When the head-mounted display device 30 is worn by the user, the optical element 33L is positioned in front of the user's left eye. The left-eye image to be displayed by the image display element 32L is introduced by the optical element 33L into the user's left eye. The optical element 33R is disposed under the image display element 32R. With the head-mounted display device 30 worn by the user, the optical element 33R is positioned in front of the user's right eye. The right-eye image to be displayed by the image display element 32R is introduced by the optical element 33R into the user's right eye. Also, the optical elements 33L and 33R are configured to be optically transmissive in such a manner as to let external incident light on the head-mounted display device 30 pass therethrough. This allows the user to view simultaneously the outside world and the images displayed by the image display elements 32L and 32R.

Figure 3:
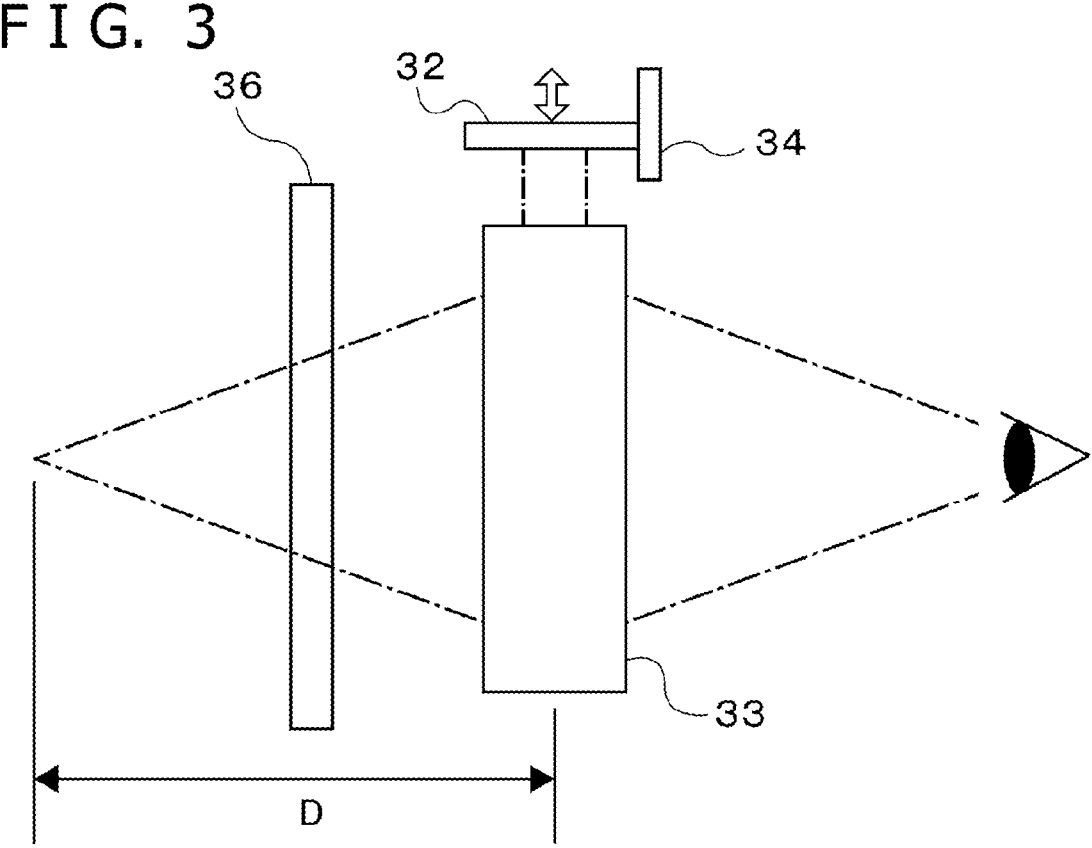
FIG. 3 is a schematic view explanatory of how an image formation distance is adjustably controlled.

The image formation distance controlling actuators 34L and 34R constitute a control mechanism that changes the optical distance between the image display elements 32L and 32R on the one hand and the optical elements 33L and 33R on the other hand. For example, the image formation distance controlling actuators 34L and 34R are implemented using a drive mechanism such as impact drive actuators, stepping motors, or a conductive macromolecular polymer. Specifically, the image formation distance controlling actuator 34L moves the image display element 32L toward the optical element 33L. The image formation distance controlling actuator 34L performs control to change the physical distance between the image display element 32L and the optical element 33L. Likewise, the image formation distance controlling actuator 34R moves the image display element 32R toward the optical element 33R. This changes the physical distance between the image display element 32R and the optical element 33R. When the distance between each image display element 32 and each optical element 33 is changed, so is the distance to an image formation position as viewed by the user. In the description that follows, the distance from each optical element 33 to the image formation position in a visual line direction of the user will be referred to as the image formation distance D. Controlling the image formation distance controlling actuators 34L and 34R individually makes it possible to adjust the image formation distance D for each of the left and the right images. The correlation between the moving distance of each image display element 32 and the image formation distance D is determined by the optical design of each optical element 33. FIG. 3 is a schematic view explanatory of how the image formation distance D is adjustably controlled. FIG. 3 schematically shows the positional relation of one image display element 32, one optical element 33, one liquid crystal shutter 36, and the user's eye as viewed laterally. A block arrow in FIG. 3 indicates the direction in which the image display element 32 is moved by the image formation distance controlling actuator 34. Specific examples of how to adjustably control the image formation distance D will be described later in detail.

Figure 4:
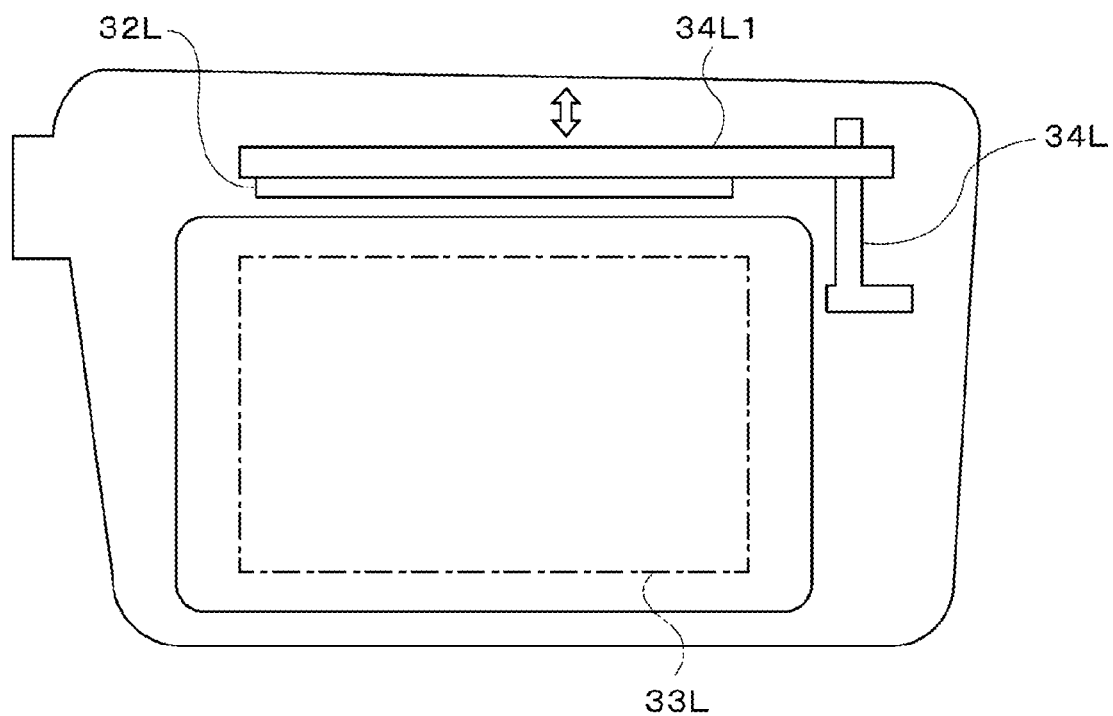
FIG. 4 is a schematic view showing an example of mounting an image formation distance controlling actuator that uses an impact drive actuator.

Some specific examples of the image formation distance controlling actuators 34 are described below. FIG. 4 schematically shows an example of mounting one image formation distance controlling actuator 34 that uses an impact drive actuator. Whereas FIG. 4 indicates only the configuration of the image formation distance controlling actuator 34L that adjusts the image formation distance D for the left-eye image, the image formation distance controlling actuator 34R may also be configured in the same manner when mounted. In the example of FIG. 4, the image display element 32L is fixed to a holder 34L1. The image formation distance controlling actuator 34L is an impact drive actuator of which the slide shaft passes through one end of the holder 34L1. Driving the impact drive actuator moves the holder 34L1 up and down, thereby changing the distance between the image display element 32L and the optical element 33L. In the example of FIG. 4, the image display element 32L is disposed above a frame surrounding the optical element 33L, with the image formation distance controlling actuator 34L disposed on the right side of the frame. Alternatively, the image display element 32L and the image formation distance controlling actuator 34L may be positioned anywhere around the optical element 33L.

Figure 5:
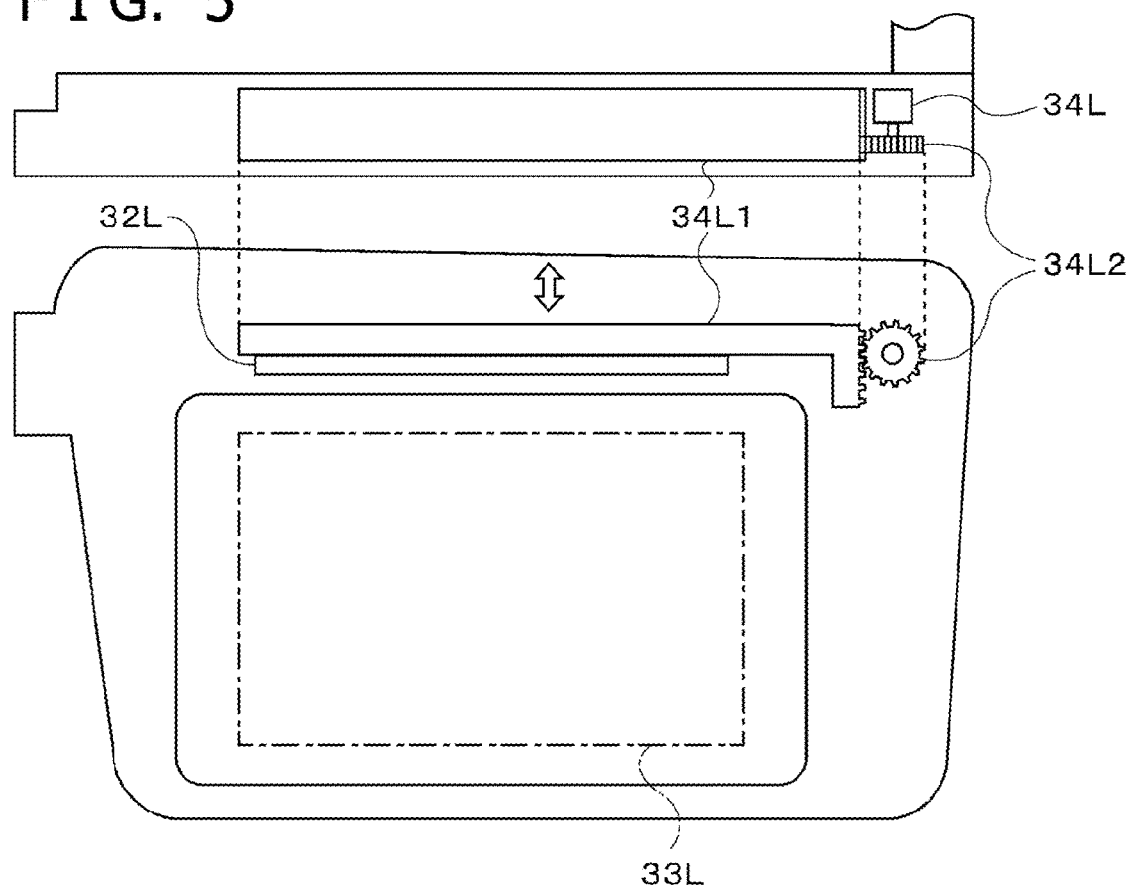
FIG. 5 is a schematic view showing an example of mounting an image formation distance controlling actuator that uses a stepping motor.

An example of mounting the image formation distance controlling actuator 34 that uses a stepping motor is described below. Where a stepping motor is utilized, the image formation distance controlling actuator 34 may be disposed on the side of the frame as in the example of FIG. 4, with the holder 34L1 moved in the axial direction of the stepping motor. Alternatively, the holder 34L1 may be moved in a direction intersecting with the axial direction of the stepping motor by means of a gear 34L2. The latter arrangement is illustrated in FIG. 5. The upper portion of FIG. 5 shows a plan view of a left-side frame portion of the head-mounted display device 30, with the lower portion indicating a front view of the left-side frame portion. In the example of FIG. 5, the stepping motor serving as the image formation distance controlling actuator 34L is disposed in such a manner that its rotating shaft is positioned in a front-back direction of the head-mounted display device 30. The gear 34L2 attached to the rotating shaft of the stepping motor is engaged with a groove formed on one edge of the holder 34L1 supporting the image display element 32L. In this arrangement, driving the stepping motor moves the image display element 32L in the vertical direction.

Figure 6:
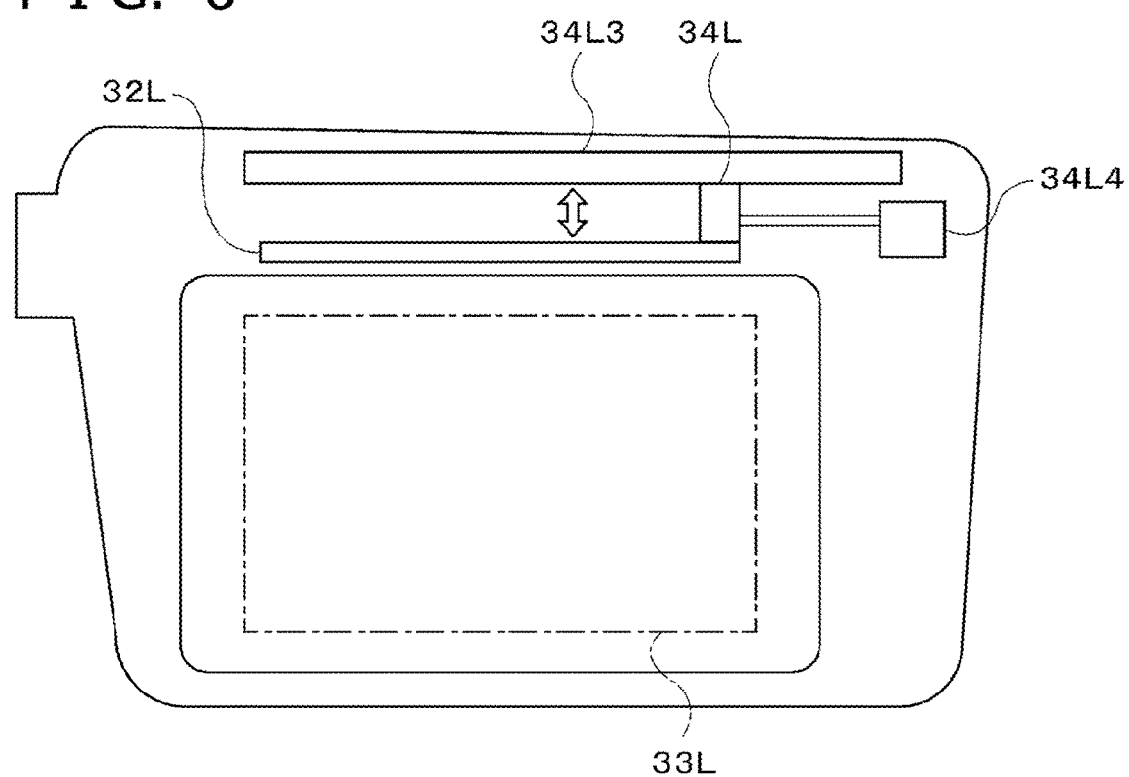
FIG. 6 is a schematic view showing an example of mounting an image formation distance controlling actuator that uses a conductive macromolecular polymer.

An example of mounting the image formation distance controlling actuator 34 that uses a conductive macromolecular polymer is described next. FIG. 6 shows an example of this arrangement. The conductive macromolecular polymer has the characteristic of expanding and contracting in accordance with the voltage applied thereto. This characteristic enables the conductive macromolecular polymer to function as an actuator. Specifically in the example of FIG. 6, the image formation distance controlling actuator 34L as a conductive macromolecular polymer is fixed to a base 34L3. The image display element 32L is further fixed to the image formation distance controlling actuator 34L. It is assumed here that the base 34L3 is fixed inside the frame so that the position of the base 34L3 remains unchanged. A signal output circuit 34L4 is connected to the image formation distance controlling actuator 34L. In response to control signals output from the signal output circuit 34L4, the image formation distance controlling actuator 34L expands and contracts. The expansion and the contraction cause the image display element 32L to move in the vertical direction, changing the distance between the image display element 32L and the optical element 33L. The signal output circuit 34L4 may be implemented as part of the actuator driving circuit 46, to be discussed later.

The liquid crystal shutters 36L and 36R, disposed on the front side of the optical elements 33L and 33R, are optically transmissive elements used to change light transmittance. Specifically, the liquid crystal shutters 36L and 36R are disposed opposite the optical elements 33L and 33R, respectively. When the user wears the head-mounted display device 30, external light passes through the liquid crystal shutter 36L and the optical element 33L, in that order, to enter the user's left eye. Likewise, external light passes through the liquid crystal shutter 36R and the optical element 33R, in that order, to enter the user's right eye. If the liquid crystal shutters 36L and 36R are fully closed to block the light, the user is prevented from viewing the outside world and allowed to view only the images displayed by the image display elements 32L and 32R. The liquid crystal shutters 36L and 36R have their light transmittance changed in accordance with drive signals coming from the liquid crystal shutter driving circuit 37. The liquid crystal shutter driving circuit 37 is an integrated circuit that operates the liquid crystal shutters 36L and 36R on the basis of control signals input from the control unit 21 of the repeating device 20.

The infrared sensor 38 and the illuminance sensor 39 are disposed at the front of the head-mounted display device 30. The infrared sensor 38 detects an infrared signal and outputs the result of the detection to the sensor hub 42. The illuminance sensor 39 detects illuminance around the head-mounted display device 30 and outputs the result of the detection to the sensor hub 42. With this embodiment, it is assumed that the illuminance sensor is capable of detecting not only the illuminance of the outside world but also its color temperature. The GPS module 40 determines the current position of the head-mounted display device 30 by receiving signals from GPS satellites. That is, the GPS module 40 functions as a position detection sensor. The current position detected by the GPS module 40 is output to the sensor hub 42.

The motion sensor module 41 measures various kinds of information about the position, orientation, and movement of the head-mounted display device 30. Specifically, the motion sensor module 41 of this embodiment has the functions of a three-axis acceleration sensor, a three-axis gyroscope, a three-axis geomagnetic sensor, and an atmospheric pressure sensor. The motion sensor module 41 outputs the results of a total of ten kinds of measurements to the sensor hub 42. These measurement results are used to determine changes in the movement and orientation of the head-mounted display device 30. Specifically, the results of the detection by the acceleration sensor are used to detect the inclination of the head-mounted display device 30 relative to the vertical direction as well as the parallel displacement of the head-mounted display device 30. The gyroscope and the geomagnetic sensor are used to detect the turning movement of the head-mounted display device 30. Furthermore, the atmospheric pressure sensor is used to detect the movement of the head-mounted display device 30 in the vertical direction.

The sensor hub 42 is an integrated circuit that integrates the outputs from the infrared sensor 38, illuminance sensor 39, GPS module 40, and motion sensor module 41 and outputs the results of the integration to the control unit 21 of the repeating device 20. The results of the measurements by these sensors are output asynchronously in different data formats. The sensor hub 42 integrates such data in the diverse formats and outputs the integrated data as serial data. In so doing, the sensor hub 42 eliminates the need for providing a broadband data communication network between the head-mounted display device 30 and the repeating device 20 or for furnishing the repeating device 20 with an interface that supports multiple data formats. This makes it possible efficiently to transmit the results of the detection by the sensors to the repeating device 20.

The front camera 43 is disposed at the front of the head-mounted display device 30 to capture the outside world in front of the user. Meanwhile, the rear cameras 44R and 44L are positioned in such a manner that they can capture the rear side (i.e., user side) of the head-mounted display device 30, capturing images of the user's left and right eyes. The images captured by these cameras are input to the camera image processing unit 23 of the repeating device 20.

The display position controlling actuators 45L and 45R constitute a drive mechanism that moves the image display units 31L and 31R to adjust the image display positions. As with the image formation distance controlling actuators 33L and 33R, the display position controlling actuators 45L and 45R may be implemented using impact drive actuators, stepping motors, or a macromolecular polymer. Alternatively, the display position controlling actuators 45L and 45R may be implemented using ball screws, voice coil motors, or linear motors. In particular, the display position controlling actuators 45L and 45R may be implemented using a drive mechanism for autofocusing or for image stabilization of a camera. Specifically, the display position controlling actuator 45L moves the entire image display unit 31L including the image display element 32L and the optical element 33L on a plane intersecting with the visual line direction of the user, independently of the image formation distance controlling actuator 34L. Such movement control may be implemented by the display position controlling actuator 45L moving a common support to which the image display element 32L and the optical element 33L are attached. Particularly with this embodiment, the display position controlling actuator 45L is disposed in such a manner that it can move the image display unit 31L horizontally and vertically on a plane approximately perpendicular to the user's visual line direction. Likewise, the display position controlling actuator 45R moves the entire image display unit 31R on a plane intersecting with the user's visual line direction. These display position controlling actuators 45 perform control to adjust the image display positions in the horizontal and vertical directions within the user's field of view. Specific examples of the display position adjustment will be discussed later in detail.

The display position controlling actuators 45L and 45R may move the image display units 31L and 31R not only on the plane intersecting with the visual line direction of the user but also along the user's visual line. Moving the image display units 31L and 31R in the visual line direction allows the head-mounted display device 30 to adjust the distances from the user's eye positions to the image display elements 32L and 32R. This provides so-called eye point adjustment enabling the user to correctly view the entire image displayed by the head-mounted display device 30.

Figure 7:
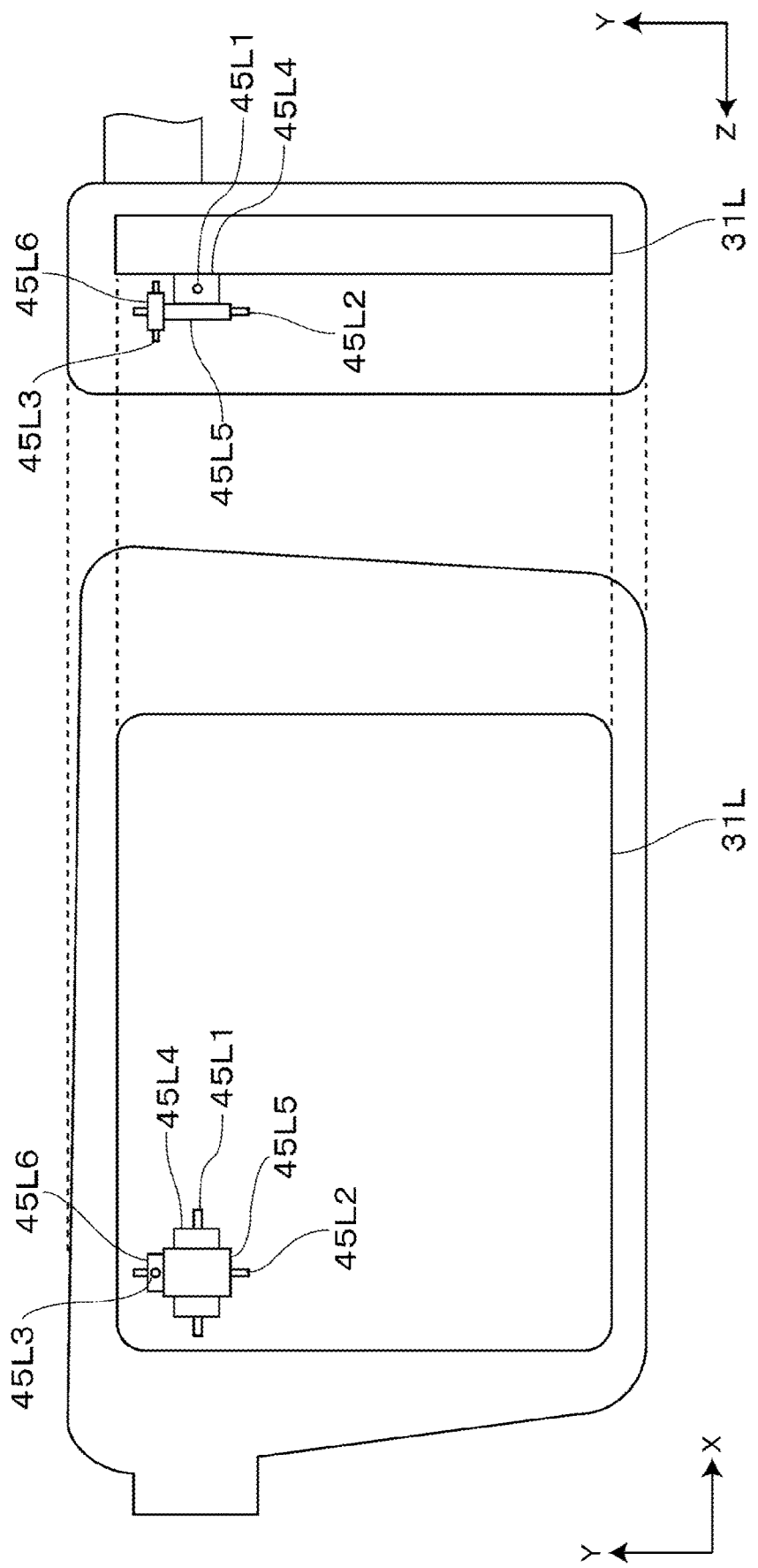
FIG. 7 is a schematic view showing an example of mounting a display position controlling actuator that uses ball screws.

A specific example of mounting the display position controlling actuators 45 is described below. FIG. 7 schematically shows a typical arrangement in which three ball screws are combined to implement one display position controlling actuator 45. The left portion of FIG. 7 shows a partial front view of the head-mounted display device 30, with the right portion indicating a partial right-side view of the head-mounted display device 30. Whereas FIG. 7 shows the configuration of only the display position controlling actuator 45L that adjusts the display position for the left-eye image, the display position controlling actuator 45R may also be configured in the same manner when mounted. In FIG. 7, three screw shafts 45L1, 45L2 and 45L3 are disposed inside the housing of the head-mounted display device 30, each screw shaft being rotated by a motor. Revolutions of the three screw shafts linearly move axially corresponding stages 45L4, 45L5 and 45L6 in the axial directions of the screw shafts. The stages 45L4, 45L5 and 45L6 are fixed to the image display unit 31L. The image display unit 31L is also moved in linkage with these stages. More specifically, the stage 45L4 is moved horizontally (X-axis direction in the drawing) by the screw shaft 45L1 being rotated. The stage 45L5 is moved vertically (Y-axis direction in the drawing) by the screw shaft 45L2 being rotated. The stage 45L6 is moved in the front-back direction (Z-axis direction in the drawing) by the screw shaft 45L3 being rotated. In this manner, the head-mounted display device 30 moves the image display unit 31L in the horizontal, vertical, and front-back directions as needed within predetermined ranges.

The actuator driving circuit 46 is an integrated circuit which, given control signals from the control unit 21 of the repeating device 20, outputs drive signals to drive the image formation distance controlling actuators 34L and 34R and the display position controlling actuators 45L and 45R accordingly.

The communication interface 47 permits data communication with the repeating device 20. For example, where the head-mounted display device 30 sends and receives data to and from the repeating device 20 via a wireless local area network (LAN) or by wireless communication such as Bluetooth (registered trademark), the communication interface 47 includes a communication antenna and a communication module.

Figure 8:
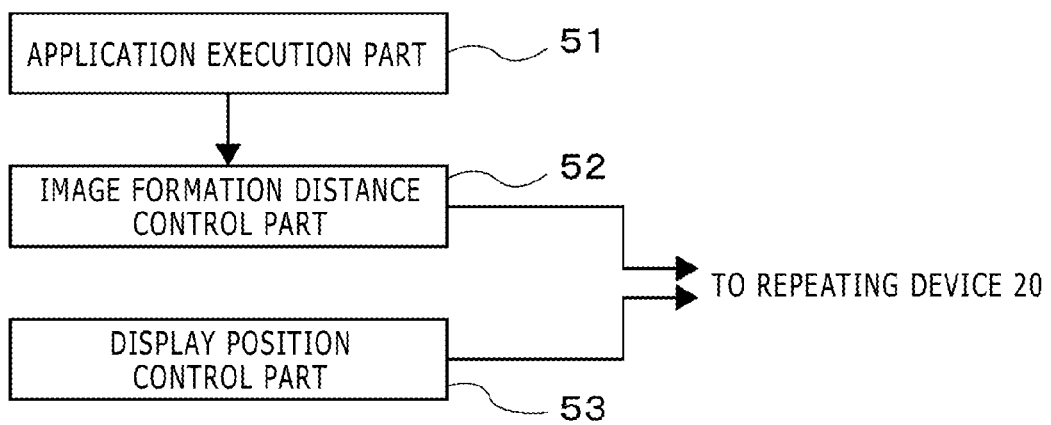
FIG. 8 is a functional block diagram showing functions of an image supply device.

The functions implemented by the image supply device 10 are described below using FIG. 8. As shown in FIG. 8, the image supply device 10 functionally includes an application execution part 51, an image formation distance control part 52, and a display position control part 53. These functions are implemented by the control part 11 executing programs stored in the storage part 12. The programs may be provided to the image supply device 10 via a communication network such as the Internet or by means of a computer-readable information storage medium such as an optical disk that stores the programs.

When the control part 11 executes an application program, the application execution part 51 provides the user with the service of that application program. As a specific example, the application execution part 51 may execute a game program to provide the user with the service of the game. The application execution part 51 may also execute an image reproduction program to present the user with images of the data retrieved from the information storage medium. In any case, the application execution part 51 generates images to be presented to the user and supplies the generated images to the head-mounted display device 30 through the repeating device 20.

The image formation distance control part 52 outputs instructions to change the image formation distances D to the control unit 21 of the repeating device 20. In accordance with the changing instructions, the control unit 21 outputs control signals to the image formation distance controlling actuators 34L and 34R, changing the image formation distances D of the head-mounted display device 30.

Particularly with this embodiment, the image formation distance control part 52 transmits to the repeating device 20 instructions to change the image formation distances D in response to instructions from the application execution part 51. Since the optically transmissive head-mounted display device 30 may let the user view the displayed image simultaneously with objects in the outside world, the user can view the image more comfortably if it is formed at a short distance to the simultaneously viewed outside objects. For this reason, the image formation distance control part 52 performs control to change the image formation distances D in accordance with the type of application program being executed by the application execution part 51. This allows the image to be formed at a distance appropriate for the content of the currently executed application program.

As a specific example, the application execution part 51 may execute multiple kinds of application programs each including a distance designation parameter. The application execution part 51 outputs to the image formation distance control part 52 the value of the image formation distance D corresponding to the distance designation parameter included in the currently executed application program. In turn, the image formation distance control part 52 outputs instructions to change the image formation distance D to the input distance value. For example, if the application program is a navigation program that provides route guidance causing the head-mounted display device 30 to display route guidance information as images, the displayed images are presumably viewed simultaneously with the outside landscape. In this case, the image formation distance D is set to a long distance (e.g., to infinity). If the application program is a program that displays cooking recipes, the user will presumably view the displayed information along with foodstuff and cooking utensils located at relatively short distances. In such a case, the image formation distance D is set to a short distance. When the image formation distance D is changed for each executed application program as described above, the user is presented with images at an appropriate distance suitable for the situation in which the head-mounted display device 30 is being used by the user. Alternatively, during execution of an application program, the application execution part 51 may output instructions to change the image formation distance D in accordance with changes in the processing of the program.

As another alternative, the image formation distance control part 52 may change the image formation distance D in keeping with the distance to an object in front of the user. In this case, the head-mounted display device 30 is assumed to be equipped with a distance sensor measuring the distance to the object ahead. The image formation distance control part 52 acquires the result of the measurement by the distance sensor from the head-mounted display device 30. The image formation distance control part 52 then performs control to change the image formation distance D in accordance with the acquired result of the measurement. This provides formation of images at a distance close to the detected object. As a result, images are formed at a distance permitting more comfortable and more accurate viewing by the user along with the outside objects.

As a further alternative, the image formation distance control part 52 may control the image formation distance D not only when the user views images simultaneously with the outside world but also when, with the liquid crystal shutters 36L and 36R closed, the user views only the images. The distance at which the user can comfortably view images varies with the user's eyesight, for example. Thus when the user uses the head-mounted display device 30 for the first time, the image formation distance control part 52 performs a calibration process to determine the image formation distance D for comfortable image viewing by the user. Specifically, with the liquid crystal shutters 36L and 36R closed to block the user's external view, the image formation distance control part 52 changes the image formation distance D in small steps while letting the user view images. The user, while viewing the images, performs a predetermined operation on the operation input device 14 when the image formation distance D is reached at which the images can be viewed most comfortably. The image formation distance control part 52 determines the image formation distance D reached when the operation is accepted as a reference image formation distance. Thereafter, whenever the user views images, the image formation distance control part 52 issues instructions to form the images at the reference image formation distance. This allows the user to view the images at the image formation distance D for comfortable viewing. When the liquid crystal shutters 36L and 36R are closed during calibration, the reference image formation distance can be determined in an environment conducive to letting the user concentrate on the images. At the time of calibration, the image formation distance control part 52 may change the image formation distance D either automatically or in small steps in keeping with input operations performed by the user on the operation input device 14.

It was explained above that the right and the left image formation distances D are adjusted in the same manner. Alternatively, the image formation distance control part 52 may let the image formation distance D for the left-eye image and the image formation distance D for the right-eye image be set to values different from each other. That is enabled because the image formation distance controlling actuators 34L and 34R of this embodiment adjust the positions of the image display elements 32L and 32R independent of each other. Thus the image formation distance control part 52 may calibrate the image formation distance D for the left-eye image and the image formation distance D for the right-eye image successively to determine the left and the right reference image formation distances individually. Specifically, the image formation distance control part 52 may let the image display element 32L alone display images with both liquid crystal shutters 36L and 36R closed and, in the same manner described above, determine the reference image formation distance for the left-eye image. The image formation distance control part 52 may then let the image display element 32R alone display images and likewise determine the reference image formation distance for the right-eye image. When the left and the right reference image formation distances are determined independent of each other, the image formation distances D are calibrated to ensure comfortable viewing by the user whose eyes may have different degrees of eyesight. If the left and the right image formation distances D are significantly different from each other, the sizes of the left and the right images viewed by the user may differ. To counter this inconvenience, the image processing unit 22 of the repeating device 20 may magnify or reduce at least either of the left-eye image and the right-eye image in accordance with the left and the right image formation distances D designated by the image formation distance control part 52. This makes it possible to have the left and the right images coincide with each other in apparent size.

Furthermore, when the image formation distance D is changed depending on the type of application program or on the content of its processing as discussed above, the application execution part 51 may designate the image formation distance D not as an absolute value but as an amount of change relative to the reference image formation distance. In this case, the image formation distance control part 52 stores beforehand the reference image formation distance determined by calibration into the storage part 12. Upon receipt of instructions from the application execution part 51 to change the image formation distance D, the image formation distance control part 52 determines as a target image formation distance the value changed from the reference image formation distance in accordance with the amount of change included in the changing instructions. The image formation distance control part 52 then outputs to the repeating device 20 instructions to change the image formation distance D to the target image formation distance thus determined. In this manner, the image formation distance D can be changed as needed in reference to the image formation distance D suitable for the user's eyesight.

The display position control part 53 outputs to the repeating device 20 instructions to change the display positions. In response to the changing instructions, the repeating device 20 outputs control signals to the display position controlling actuators 45L and 45R, causing the head-mounted display device 30 to change the image display positions. Particularly with this embodiment, the display position control part 53 moves the display positions in keeping with the user's actual eye positions. This control is implemented as follows: The display position control part 53 acquires from the repeating device 20 camera images captured by the rear cameras 44R and 44L. The display position control part 53 analyzes the acquired camera images to determine the user's eye positions within the fields of view of the rear cameras 44R and 44L. In accordance with the user's eye positions thus determined, the display position control part 53 outputs to the repeating device 20 instructions to change the display positions. In this manner, images are displayed approximately in front of the user's eyes regardless of individual differences such as the physique of the user wearing the head-mounted display device 30 or a specific manner in which the head-mounted display device 30 is worn.

Figure 9:
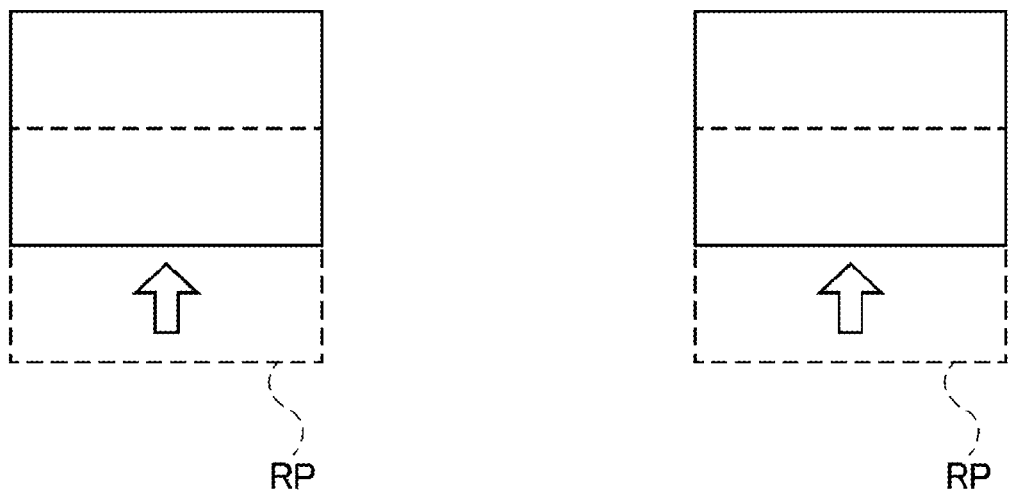
FIG. 9 is a schematic view showing an example of adjustably controlling two image display positions in the same direction.

As a specific example, if the determined eye positions are in the upper part of the field of view of each rear camera, the user's eyes are presumed to be positioned higher than reference positions (or the user is presumably wearing the head-mounted display device 30 at a lower position). In such a case, the display position control part 53 moves the image display positions higher than reference positions RP by controlling the display position controlling actuators 45L and 45R to shift the image display units 31L and 31R upward. The reference position RP in this context is the position predetermined as a reference for displaying images. For example, the reference position RP may be each of the positions for displaying the left-eye and right-eye images when the image display units 31L and 31R are moved to the center of each of the ranges within which they can be moved by the display position controlling actuators 45L and 45R. FIG. 9 shows an example in which the display positions are moved higher than the reference positions RP. In the drawing, solid lines indicate the display positions for the left and right images, and broken lines denote the reference positions RP. Conversely, if the user's eyes are presumed to be positioned lower than the reference positions, the display position control part 53 need only output changing instructions to move the image display unit 31L and 31R downward.

Figure 10:
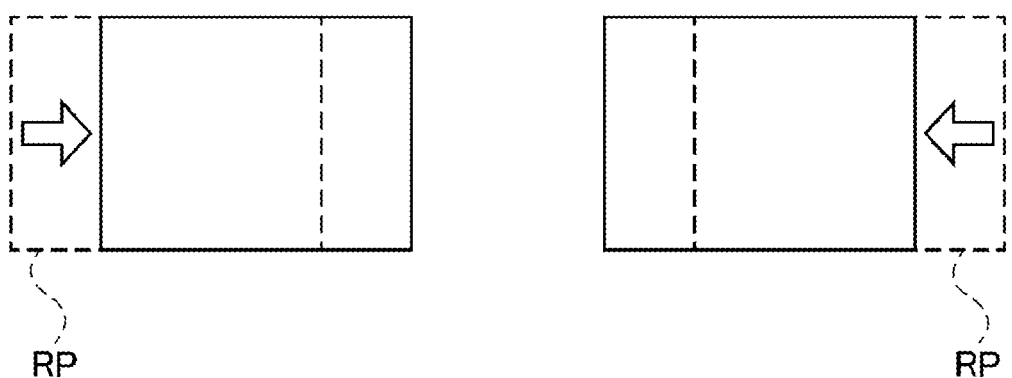
FIG. 10 is a schematic view showing an example of adjustably controlling two image display positions in opposite directions.

The display position control part 53 may move the image display units 31L and 31R in mutually opposite directions. For example, suppose that the distance between both eyes of the user is determined to be shorter than a reference distance based on the camera images from the rear cameras 44R and 44L. In that case, the display position control part 53 reduces the distance between both eyes by moving the image display unit 31L rightward and the image display unit 31R leftward as viewed from the user. FIG. 10 shows an example in which the display position for the left-eye image and the display position for the right-eye image are brought closer to each other in the manner described above. If the distance between both eyes of the user is determined to be longer than the reference distance, the image display units 31R and 31L are moved away from each other.

Figure 11:
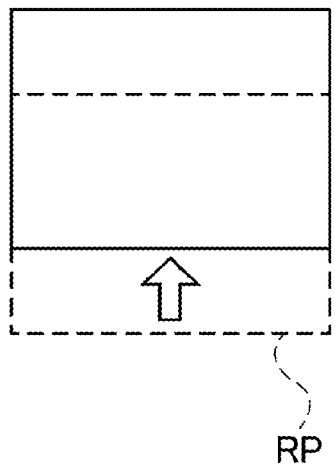
FIG. 11 is a schematic view showing another example of adjustably controlling two image display positions in opposite directions.
Figure 11:
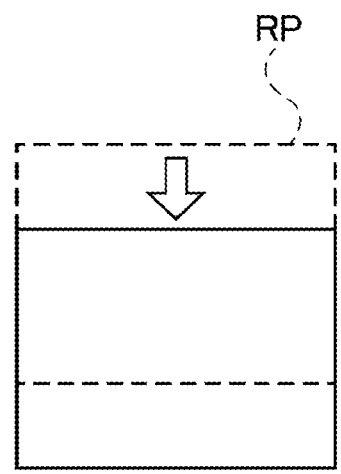

If the user wears the head-mounted display device 30 obliquely for example, one of the image display units 31L and 31R may be moved upward and the other downward. FIG. 11 shows typical display positions reached when the image display unit 31L is moved upward and the image display unit 31R downward.

Figure 12:
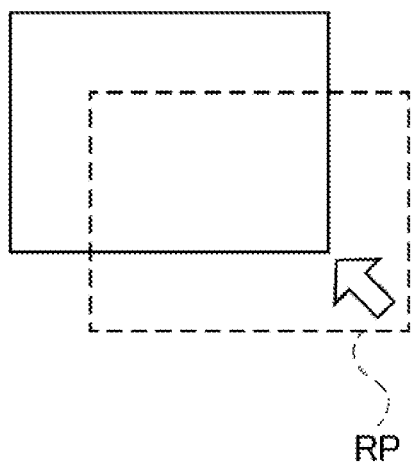
FIG. 12 is a schematic view showing an example of adjustably controlling the display positions in accordance with visual line directions.
Figure 12:
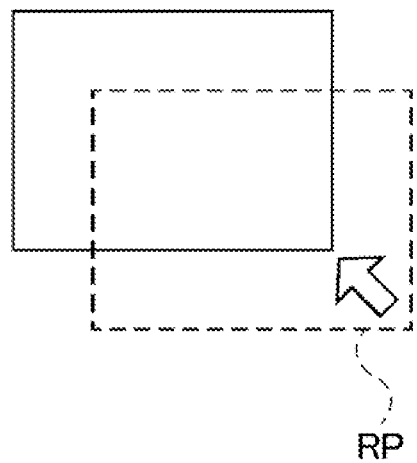

Furthermore, the display position control part 53 may determine not only the positions of the user's eyes; the display position control part 53 may also determine the user's visual line directions and move the image display units 31L and 31R in a manner reflecting the result of the determination. The display position control part 53 can determine the user's visual line directions based on the images from the rear cameras 44R and 44L through the use of known techniques for determining the user's visual line direction from images captured of both eyes of the user. In this example, the display position control part 53 first moves the image display units 31L and 31R in keeping with the user's eye positions. If the user changes his or her visual line direction vertically or horizontally from the front direction, the display position control part 53 moves the image display units 31L and 31R in the visual line directions. The head-mounted display device 30 then displays images in the user's field of view in a manner keeping track of changes in the user's visual line directions. FIG. 12 shows how displayed images are typically positioned when the user's visual lines are directed in the top left direction. When the image display positions are moved in a manner tracking the visual line directions, the user is made to view the images displayed in ranges larger than the actual image sizes. Also, the images displayed by the image display units 31L and 31R have little distortion near their centers but may include more distortion close to their peripheries. When the image display positions are moved in keeping with the user's visual line directions as described above, the spots attracting the user's attention are always controlled to be at or near the centers of the images. It is to be noted that when the display positions are shifted from the reference positions RP in a manner keeping track of the user's moving visual lines, the user views the images not frontally but obliquely. This can cause the user to feel that the images are distorted. In such a case, the image processing unit 22 of the repeating device 20 may perform distortion correction on the displayed images in keeping with the changing display positions.

Figure 13:
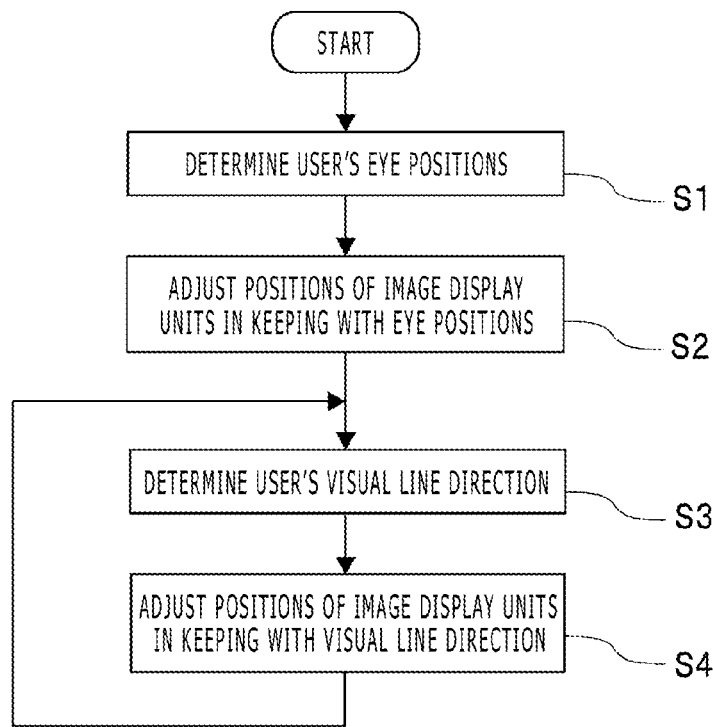
FIG. 13 is a flowchart showing a typical flow of adjustably controlling the display positions.

A typical flow of the above-described control executed by the display position control part 53 is explained below using the flowchart of FIG. 13. When the user wears the head-mounted display device 30 and gives the operation input device 14 instructions to start using the device 30, the display position control part 53 acquires via the repeating device 20 images captured by the rear cameras 44L and 44R. Using the acquired images, the display position control part 53 determines the positions of both eyes of the user (S1). In accordance with the eye positions determined in S1, the display position control part 53 outputs control instructions to move the image display units 31L and 31R (S2). In response to the control instructions, the display position controlling actuators 45L and 45R move the image display units 31L and 31R in a manner displaying images close to the front of the user's eyes.

Thereafter, the display position control part 53 determines the visual line directions of the user's both eyes using images from the rear cameras 44L and 44R (S3). The display position control part 53 then outputs control instructions to move the image display units 31L and 31R in accordance with the determined visual line directions (S4). Given the control instructions, the display position controlling actuators 45L and 45R move the image display units 31L and 31R in the directions of the user's visual lines. This enables the head-mounted display device 30 to display images in the user's visual line directions. As long as the user is viewing the images displayed by the head-mounted display device 30, the display position control part 53 repeats the processing of S3 and 34. This provides control such that the image display positions are shifted in a manner keeping track of the moving visual lines of the user.

Described below are some specific examples of the functions implemented by the image display system 1 embodying the present invention.

The head-mounted display device 30 functions not only to display stereoscopic images on its own but also serve as 3D glasses permitting viewing of stereoscopic images displayed by another stereoscopic image display device. In the latter case, the stereoscopic image display device displays stereoscopic images by a frame sequential method. The head-mounted display device 30 receives via the infrared sensor 38 signals of switchover instructions transmitted from the stereoscopic image display device using infrared rays. The head-mounted display device 30 outputs the received signals to the repeating device 20. Every time the switchover instruction signal is received, the control unit 21 of the repeating device 20 outputs to the head-mounted display device 30 drive signals for driving the liquid crystal shutters 36L and 36R. Given the drive signals, the head-mounted display device 30 closes the liquid crystal shutter 36L with the stereoscopic image display device displaying the right-eye image, or closes the liquid crystal shutter 36R with the stereoscopic image display device displaying the left-eye image. This allows the user to view stereoscopic images displayed by the stereoscopic image display device.

The head-mounted display device 30 may use the internal motion sensor module 41 to implement head tracking for detecting the user's head movement. In keeping with the detected head movement, the application execution part 51 of the image supply device 10 moves the position and orientation of the user's viewpoint in a virtual 3D space to generate images showing the situation in the 3D space, and supplies the generated images to the head-mounted display device 30. In this manner, the user is presented with the images that are changed in accordance with the user's head movement.

Also, the repeating device 20 may use the result of the detection by the illuminance sensor 39 to perform control such that the user can view images comfortably in keeping with the light environment of the outside world. For example, the control unit 21 of the repeating device 20 adjusts the light transmittance of the liquid crystal shutters 36L and 36R in accordance with the illuminance value detected by the illuminance sensor 39. More specifically, when the surroundings of the head-mounted display device 30 are well-lighted, the control unit 21 reduces the light transmittance of the liquid crystal shutters 36L and 36R so as to lower the glare of the outside light and let the user view images more comfortably. Also, the image processing unit 22 of the repeating device 20 may perform a color conversion process to change the color tone of the displayed images in accordance with the color temperature of the outside light detected by the illuminance sensor 39. This permits displaying of images in an easy-to-see color tone for viewing by the user watching them simultaneously with the outside world.

Furthermore, the image supply device 10 may generate images using a camera image captured by the front camera 43 of the head-mounted display device 30. In this case, the application execution part 51 of the image supply device 10 receives from the repeating device 20 the camera image captured by the front camera 43 and has the received image overlaid with other images to generate images to be displayed by the head-mounted display device 30. Specifically, the application execution part 51 may analyze the camera image, extract feature points of a target object therefrom, and have the positions of the extracted feature points overlaid with other images to generate images adapted to the target object.

Also, the head-mounted display device 30 may collect the results of the detection by its various sensors as the user's behavior records and store the records into the image supply device 10. In particular, records of the user's movement collected by the GPS module 40 and motion sensor module 41 may be combined with the camera image from the front camera 43 so that the camera image may be recorded in association with the location where the image was captured.

Furthermore, the above-mentioned sensors may be configured to be removably attachable to the head-mounted display device 30. Specifically, some or all of the infrared sensor 38, illuminance sensor 39, GPS module 40, motion sensor module 41, sensor hub 42, and front camera 43 may be formed as a unit removably attachable to the head-mounted display device 30. Such a sensor unit may be equipped with its own wireless communication interface that can transmit acquired data to either the repeating device 20 or the head-mounted display device 30. This sensor unit, capable of detecting diverse kinds of information, may be used as part of the head-mounted display device 30 or may be attached to another object (e.g., a pet, or an autonomously moving toy) as its monitor. If the sensor unit is furnished with the sensor hub 42, the results of the detection by multiple sensors may be integrally transmitted easily to another device.

The embodiment of the present invention is not limited to the examples discussed above. Alternatively, the image supply device 10 may implement at least part of the processing of image signal output described above as implemented by the repeating device 20. Conversely, the repeating device 20 may implement at least part of the processing described above as implemented by the image supply device 10. As another alternative, an integrated circuit inside the head-mounted display device 30 may be used to implement part of the processing described above as implemented by the repeating device 20. As a further alternative, the repeating device 20 may not be needed if all of the processing described above as implemented by the repeating device 20 is implemented by the image supply device 10 and the head-mounted display device 30.

It was explained above that the head-mounted display device 30 has two image display units 31. Alternatively, however, the head-mounted display device 30 may be a monocular display device equipped with only one image display unit 31 for viewing with one eye. It was also explained above that the head-mounted display device 30 is an optically transmissive display device that allows the user to view the outside world. Alternatively, the head-mounted display device 30 may be an optically nontransmissive display device that prevents the user from viewing the outside world. Even in this case, the head-mounted display device 30 enables the user to view images in a manner suitable for the user and the content of the display by causing the image formation distance controlling actuators 34 to adjust the image formation distances D or by getting the display position controlling actuators 45 to change the image display positions.

Figure 14:
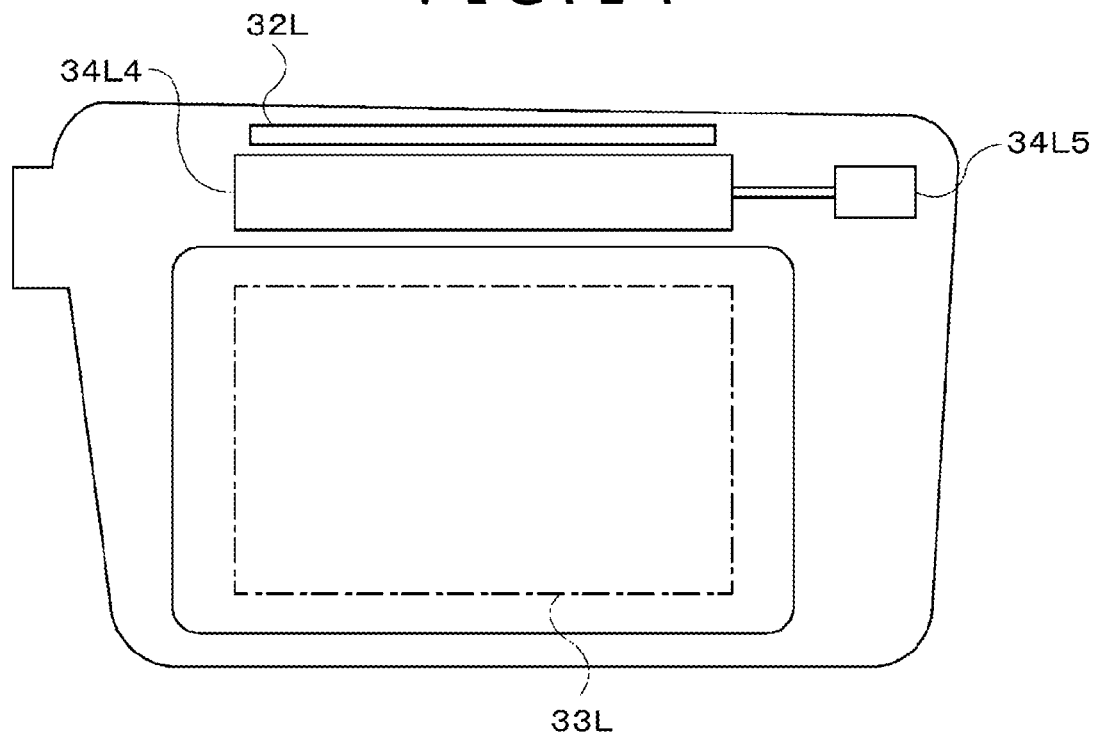
FIG. 14 is a schematic view showing an example of mounting an image formation distance control mechanism that uses a refractive index adjusting element.

It was explained above that the image formation distance controlling actuators 34 change the optical distances between the image display elements 32 and the optical elements 33 by physically moving the image display elements 32. Alternatively, the image formation distance controlling actuators 34 may move not the image display elements 32 but the optical elements 33 to change the optical distances therebetween. As another alternative, instead of using the drive mechanism that changes the physical distances between the image display elements 32 and the optical elements 33, the head-mounted display device 30 may utilize an image formation distance control mechanism that changes the refractive index of a light path between these elements so as to vary the optical distances therebetween. In this case, the image formation distance control mechanism may be implemented using a refractive index adjusting element such as a liquid crystal lens or a liquid lens disposed between the image display elements 32 and the optical elements 33. FIG. 14 schematically shows an example of mounting such an image formation distance control mechanism. In the example of FIG. 14, a refractive index adjusting element 34L5 is disposed between the image display element 32L and the optical element 33L. The refractive index adjusting element 34L5 is connected with a signal output circuit 34L6. In response to a control signal output from the signal output circuit 34L6, the refractive index adjusting element 34L5 has its refractive index changed accordingly. Changing the refractive index of the refractive index adjusting element 34L5 varies the optical distance between the image display element 32L and the optical element 33L. With the optical distance thus changed, the image formation distance D for the left-eye image is changed accordingly. This type of image formation distance control mechanism can control the image formation distance D without physically moving the image display elements 32 or the optical elements 33. This makes it possible to prevent drive-related noise from being generated.

Figure 15:
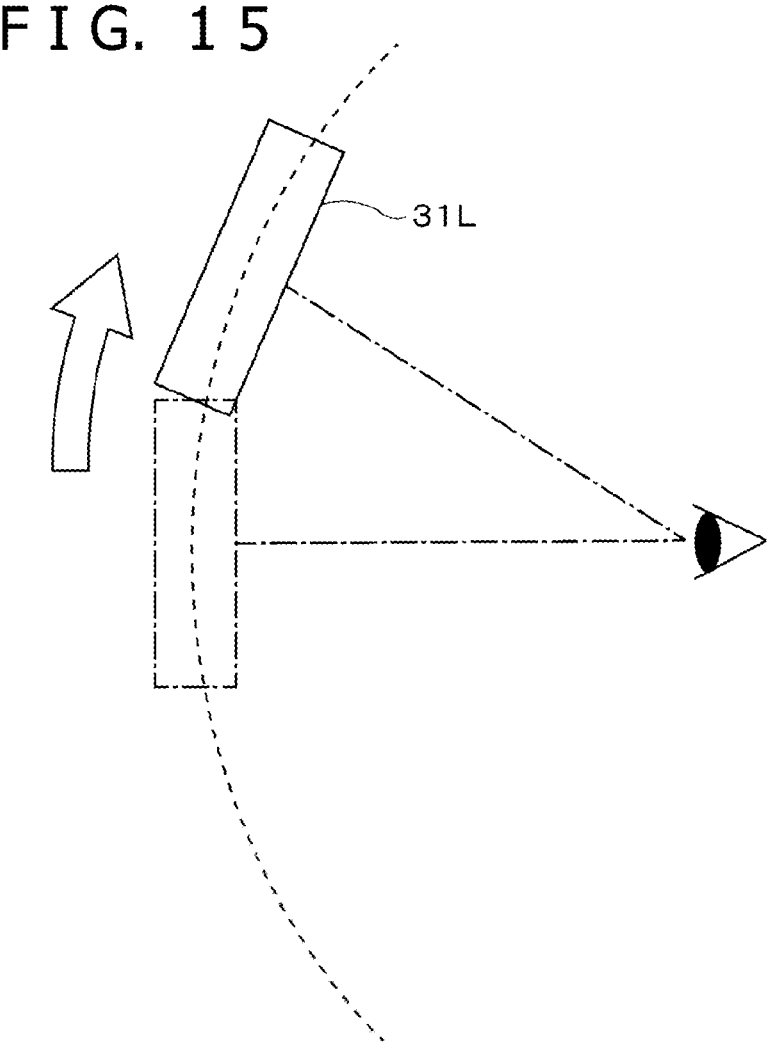
FIG. 15 is a schematic view showing a variation of a display position adjustment mechanism.

It was explained above that the display position controlling actuators 45L and 45R move in parallel the image display units 31L and 31R vertically and horizontally on the plane approximately perpendicular to the visual line directions of the user. In this case, the orientation of the image display surfaces of the image display units 31L and 31R remains unchanged; they are always oriented in the same direction. Alternatively, however, the display position controlling actuators 45L and 45R may move each of the image display units 31L and 31R along a curved surface intersecting with the user's visual line direction. The curved surface should preferably bulge away from the user (i.e., on the front side of the head-mounted display device 30) and have an approximately spherical shape centering on the user's eye positions. When the image display units 31L and 31R are moved along the curved surface, their display surfaces are changed accordingly in orientation. FIG. 15 schematically shows an example of a path along which the image display unit 31L moves under such control. FIG. 15 shows the positional relation between the image display unit 31L and the user's left eye as viewed laterally. A broken line in the drawing indicates the path along which the image display unit 31L moves driven by the display position controlling actuator 45L. By moving the image display unit 31L along that path in keeping with the user's visual line direction, the display position control part 53 can move the image display unit 31L in the direction directly opposite the user's visual line regardless of the user's visual line being directed upward or downward. This minimizes the distortion of the images viewed by the user. Likewise, when moving the image display units 31L and 31R horizontally, the display position controlling actuators 45L and 45R may move them rotatably and in a manner directly opposite the user's visual lines as much as possible. This kind of drive along the curved surface may be implemented using ball screws, curved screws, voice coil motors, or linear motors, for example.

Furthermore, the display position controlling actuators 45L and 45R may control the positions of the image display units 31L and 31R by suitably combining two kinds of movements: a movement along a plane intersecting with the user's visual line directions, and a movement along a curved surface. For example, when moving the image display units 31L and 31R in keeping with the user's eye positions as in S2 in the example of FIG. 13, the display position controlling actuators 45L and 45R move each image display unit 31 along a plane opposite the user's face (i.e., a plane approximately perpendicular to the user's visual line directions). On the other hand, when moving the image display units 31L and 31R in keeping with the user's visual line directions as in S4 in the example of FIG. 13, the display position controlling actuators 45L and 45R move each image display unit 31 along a curved surface that bulges in the front direction of the user as illustrated in FIG. 15 to keep track of the user's turning eyeballs. This permits control of the position of each display unit 31 in such a manner that each display unit 31 is always opposite the directions in which the user's eyes are oriented. In any of the above-described cases, the display position controlling actuators 45L and 45R move each image display unit 31 in the direction intersecting with the user's visual line direction.

It was also explained above that the planar type image display elements 32L and 32R display images and that the light representing the images is introduced by the optical elements 33L and 33R into the user's left and right eyes respectively. However, this method is not limitative of the head-mounted display device 30. Alternatively, the head-mounted display device 30 may present the user with images using any one of diverse methods. For example, the head-mounted display device 30 may be a retinal illumination type (i.e., retinal projection type) device which project images directly on the retinas of the user. In this case, the image display elements 32L and 32R may be implemented typically using light-emitting lasers and micro electro mechanical system (MEMS) mirrors for laser light scanning. The light is introduced by the optical elements 33L and 33R such as half mirrors into the user's eyes. Introducing the scanning light into the user's eyes forms images directly on the user's retinas. With the retinal illumination type display device, too, the positions of the images recognized by the user may be shifted as desired vertically and horizontally by moving both the image display unit 31L including the image display element 32L and optical element 33L and the image display unit 31R including the image display element 32R and optical element 33R in directions intersecting with the user's visual line directions. In particular, the retinal illumination type display device requires that light be introduced precisely in keeping with eye positions and the visual line directions of the user. This is where display position control by the display position controlling actuators 45L and 45R is effective.

It was also explained above that the display position controlling actuator 45L moves the entire image display unit 31L including the image display element 32L and optical element 33L and that the display position controlling actuator 45R moves the image display element 32R and the optical element 33R altogether. Alternatively, however, each display position controlling actuator 45 may change the image display position at which images are presented to the user's eye as long as the optical element 33L or 33R for introducing image-associated light ultimately into the user's eye can be moved in a direction intersecting with the user's visual line direction. For this reason, some image presentation methods for use with this invention may involve causing each of the display position controlling actuators 45L and 45R to move not the entire image display unit 31L or 31R but only some components including at least the optical element 33L or 33R.

REFERENCE SIGNS LIST

1 Image display system, 10 Image supply device, 11 Control part, 12 Storage part, 13 Interface part, 14 Operation input device, 20 Repeating device, 21 Control unit, 22 Image processing unit, 23 Camera image processing unit, 30 Head-mounted display device, 31L, 31R Image display unit, 32L, 32R Image display element, 33L, 33R Optical element, 34L, 34R Image formation distance controlling actuator, 35 Image display element driving circuit, 36L, 36R Liquid crystal shutter, 37 Liquid crystal shutter driving circuit, 38 Infrared sensor, 39 Illuminance sensor, 40 GPS module, 41 Motion sensor module, 42 Sensor hub, 43 Front camera, 44L, 44R Rear camera, 45L, 45R Display position controlling actuator, 46 Actuator driving circuit, 47 Communication interface, 51 Application execution part, 52 Image formation distance control part, 53 Display position control part

The invention claimed is:
1. An image display system comprising:
   an optical element disposed in front of an eye of a user and configured to introduce light associated with an image to be presented to the user into the eye of the user;
   a drive mechanism configured to move the optical element in a direction intersecting with a visual line direction of the user,
   wherein the drive mechanism comprises:
      a first stage for translating the optical element in a first linear direction;
      a second stage for translating the optical element in a second linear direction; and
      a third stage for translating the optical element in a third linear direction, wherein the first linear direction is orthogonal to the second linear direction, wherein the second linear direction is orthogonal to the third linear direction, and wherein the first linear direction is orthogonal to the third linear direction;

a camera configured to capture an image including the eye of the user;

an image supply part configured to supply the image to the optical element; and a display position control part configured to output a control instruction to operate the drive mechanism in a manner changing the position at which the image is displayed within a field of view of the user;

wherein the display position control part changes the display position for the image to a position determined in accordance with the position of the eye of the user within the image captured by the camera, the determined position being opposite the eye of the user.

2. The image display system according to claim 1, wherein the display position control part changes the display position for the image to a position determined in accordance with the visual line direction of the user determined on the basis of the image captured by the camera.

3. The image display system according to claim 1, wherein the display control part outputs a second control instruction to the drive mechanism in accordance with a detected spacing between eyes of the user.

4. An image supply device connected with a head-mounted display device having a drive mechanism configured to move an optical element for introducing light associated with an image to be presented to a user into an eye of the user, the optical element being moved in a direction intersecting with a visual line direction of the user, the image supply device comprising:

an image supply part configured to supply the image to the head-mounted display device;

an acquisition part configured to acquire an image from a camera configured to capture the image including the eye of the user; and a display position control part configured to output a control instruction to operate the drive mechanism in a manner changing the position at which the image is displayed within a field of view of the user;

wherein the drive mechanism comprises:

a first stage for translating the optical element in a first linear direction;

a second stage for translating the optical element in a second linear direction; and a third stage for translating the optical element in a third linear direction, wherein the first linear direction is orthogonal to the second linear direction, wherein the second linear direction is orthogonal to the third linear direction, and wherein the first linear direction is orthogonal to the third linear direction.

5. A non-transitory computer-readable information storage medium that stores a program for a computer connected with a head-mounted display device having a drive mechanism configured to move an optical element for introducing light associated with an image to be presented to a user into an eye of the user, the optical element being moved in a direction intersecting with a visual line direction of the user, the program comprising:

by an image supply part, supplying the image to the head-mounted display device;

by an acquisition part, acquiring an image from a camera configured to capture the image including the eye of the user; and by a display position control part, outputting a control instruction to operate the drive mechanism in a manner changing the position at which the image is displayed within a field of view of the user to a position determined in accordance with the position of the eye of the user within the image captured by the camera, the determined position being opposite the eye of the user;

wherein the drive mechanism comprises:

a first stage for translating the optical element in a first linear direction;

a second stage for translating the optical element in a second linear direction; and a third stage for translating the optical element in a third linear direction, wherein the first linear direction is orthogonal to the second linear direction, wherein the second linear direction is orthogonal to the third linear direction, and wherein the first linear direction is orthogonal to the third linear direction.

* * * * *